US008886657B2

(12) United States Patent
Warn

(10) Patent No.: US 8,886,657 B2
(45) Date of Patent: Nov. 11, 2014

(54) ASSOCIATIVE MEMORY VISUAL EVALUATION TOOL

(75) Inventor: Brian Warn, Seattle, WA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 13/250,029

(22) Filed: Sep. 30, 2011

(65) Prior Publication Data

US 2013/0086011 A1 Apr. 4, 2013

(51) Int. Cl.
*G06F 17/30* (2006.01)
(52) U.S. Cl.
CPC ....... *G06F 17/30982* (2013.01); *Y10S 707/955* (2013.01); *Y10S 707/961* (2013.01)
USPC .................... 707/755; 707/E17.141; 707/955; 707/961; 707/E17.035; 711/108; 715/204
(58) Field of Classification Search
USPC ........... 707/961, 955, E17.035, E17.141, 755
See application file for complete search history.

(56) References Cited

U.S. PATENT DOCUMENTS

| 5,659,742 A | 8/1997 | Beattie et al. | |
|---|---|---|---|
| 5,893,131 A | 4/1999 | Kornfeld | |
| 2005/0125261 A1 | 6/2005 | Adegan | |
| 2006/0161535 A1* | 7/2006 | Holbrook | 707/3 |
| 2011/0093479 A1 | 4/2011 | Fuchs | |

FOREIGN PATENT DOCUMENTS

WO   WO2009035930 A1   3/2009

OTHER PUBLICATIONS

Hausser, Parsing Natural Language into Content for Storage and Retrieval in a Content-Addressable Memory, NLDB 2010, LNCS 6177, 2010, pp. 169-176.*
Application Note AN8071, Content Addressable Memory (CAM) Applications for ispXPLD Devices, Jul. 2002, pp. 1-9.*
Steve Litt's PERLs of Wisdom: PERL Regular Expressions (With Snippets), Dec. 31, 2005, pp. 1-8.*
Debugging, Wikipedia, the free encyclopedia, Apr. 22, 2009, pp. 1-4.*
"Windows Directory Statistics", WinDirStat, Version 1.1.2, 2 pages, accessed Sep. 8, 2011, http://windirstat.info/.
"JGOODIES: Java User Interface Design", Freeware, JDiskReport, Screenshots, 2 pages, accessed Sep. 8, 2011, http://www.jgoodies.com/freeware/jdiskreport/screenshots.html.
European Search Report, dated Jul. 3, 2013, regarding Application No. EP12186045.6, 6 pages.

* cited by examiner

*Primary Examiner* — Albert Phillips, III
(74) *Attorney, Agent, or Firm* — Yee & Associates, P.C.

(57) ABSTRACT

A method, apparatus, and non-transitory computer readable storage medium for validating content is provided. Data is parsed into at least a first group of data and a second group of data according to a plurality of types of content present in the data. The data is ingested into an associative memory. The associative memory forms a plurality of associations among the data. The associative memory is configured to be queried based on at least one relationship selected from a group consisting of direct relationships and indirect relationships among the data. The associative memory comprises a content-addressable structure, the content-addressable structure comprising a memory organization in which the data is configured to be accessed by the content as opposed to being configured to be accessed by addresses for the data. The first group of data and the second group of data are communicated in a graphical representation.

17 Claims, 9 Drawing Sheets

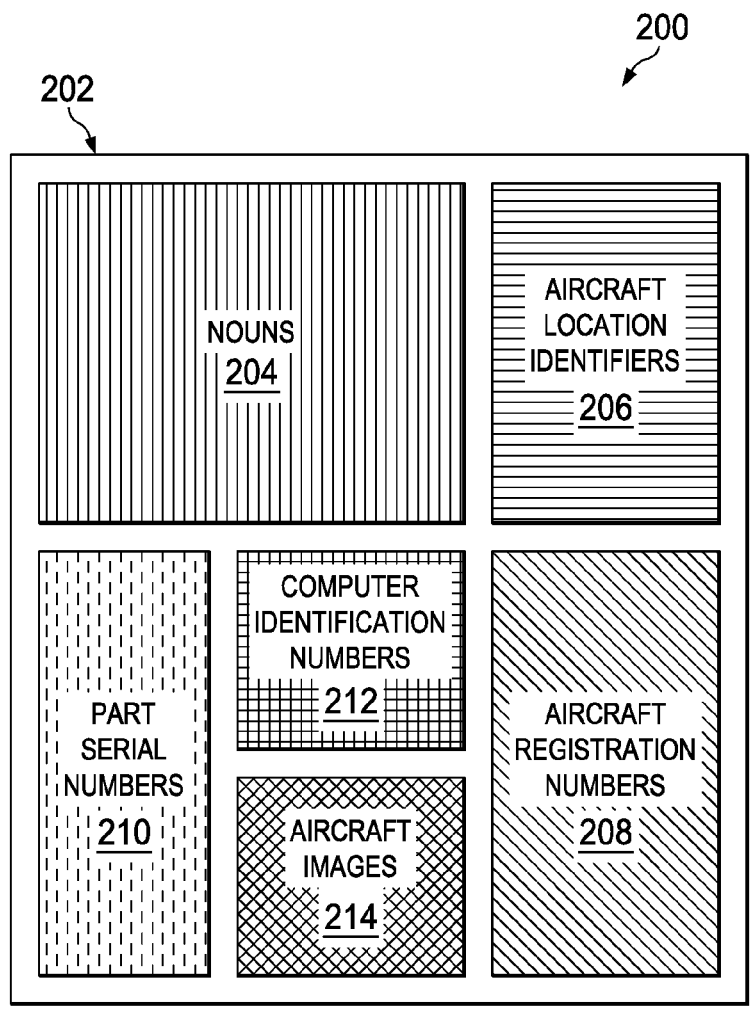
FIG. 2
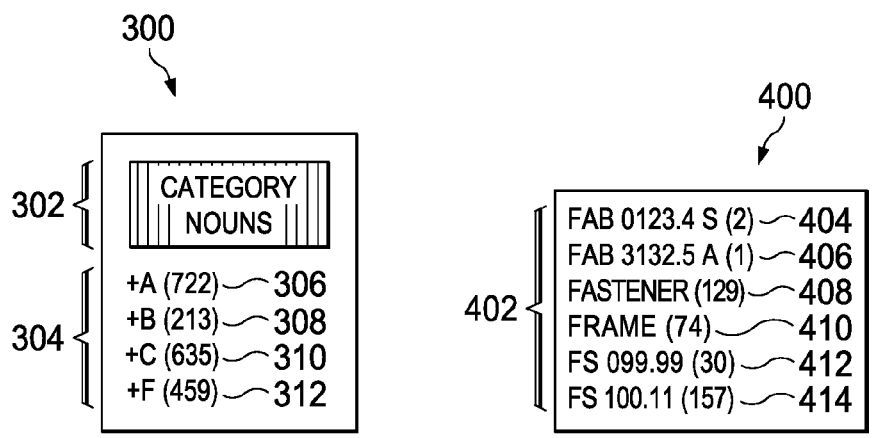
FIG. 3
FIG. 4

ASSOCIATIVE MEMORY VISUAL EVALUATION TOOL

BACKGROUND INFORMATION

1. Field

The present disclosure relates generally to associative memory and, in particular, to a method and apparatus for visually evaluating the contents of an associative memory.

2. Background

Human intelligence, which also may be referred to as natural intelligence, has been studied in order to improve artificial intelligence systems. When recalling items, events, and/or concepts from memory, human intelligence may take into account how these items, events, or concepts are related. Collectively, items, events, and/or concepts may be known as "entities". Human intelligence may take into account associations between a previously experienced entity and other entities when recalling the previously experienced entity. In this manner, human intelligence uses a memory that is based on associations in order to recall entities that have been previously experienced.

Our current understanding of human intelligence may be useful in the computer arts. It may be desirable to use human intelligence to improve the effectiveness and speed of software and hardware in computer systems. Therefore, it would be advantageous to have a method and apparatus that takes into account at least some of the issues discussed above, as well as possibly other issues.

SUMMARY

In one advantageous embodiment, an apparatus for validating content is provided. The apparatus comprises an associative memory, a parser, and a visualizer. The associative memory comprises a plurality of data and a plurality of associations among the plurality of data. The associative memory is configured to be queried based on at least one relationship selected from a group consisting of direct relationships and indirect relationships among the plurality of data. The associative memory also comprises a content-addressable structure, the content-addressable structure comprising a memory organization in which the plurality of data is configured to be accessed by content as opposed to being configured to be accessed by addresses for the plurality of data. The parser is in communication with the associative memory. The parser is configured to parse the plurality of data into at least a first group of data and a second group of data. The parser parses the plurality of data according to a plurality of types of content present in the plurality of data. The visualizer is configured to communicate the first group of data and the second group of data in a graphical representation.

In another advantageous embodiment, a method for validating content is provided. A plurality of data is parsed into at least a first group of data and a second group of data according to a plurality of types of content present in the plurality of data. The plurality of data is ingested into an associative memory. The associative memory forms a plurality of associations among the plurality of data. The associative memory is configured to be queried based on at least one relationship selected from a group consisting of direct relationships and indirect relationships among the plurality of data. The associative memory comprises a content-addressable structure, the content-addressable structure comprising a memory organization in which the plurality of data is configured to be accessed by content as opposed to being configured to be accessed by addresses for the plurality of data. The first group of data and the second group of data are communicated in a graphical representation.

In yet another advantageous embodiment, a non-transitory computer readable storage medium is provided. The non-transitory computer readable storage medium stores program code comprising first program code, second program code, and third program code. The first program code is for instructing a processor to cause an associative memory to ingest a plurality of data into the associative memory. By ingesting the plurality of data into the associative memory, the associative memory is configured to form a plurality of associations among the plurality of data. The associative memory is configured to be queried based on at least one relationship selected from a group consisting of direct relationships and indirect relationships among the plurality of data. The associative memory comprises a content-addressable structure, the content-addressable structure comprising a memory organization in which the plurality of data is configured to be accessed by content as opposed to being configured to be accessed by addresses for the plurality of data. The second program code is for instructing the processor to parse the plurality of data into at least a first group of data and a second group of data according to a plurality of types of content present in the plurality of data. The third program code is for instructing the processor to communicate the first group of data and the second group of data in a graphical representation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof will best be understood by reference to the following detailed description of an advantageous embodiment of the present disclosure when read in conjunction with the accompanying drawings, wherein:

FIG. 2 is an illustration of a display of the content in an associative memory in accordance with an advantageous embodiment;

FIG. 3 is an illustration of a display of the content in an associative memory in accordance with an advantageous embodiment;

FIG. 4 is an illustration of a display of the content in an associative memory in accordance with an advantageous embodiment;

DETAILED DESCRIPTION

Figure 1:
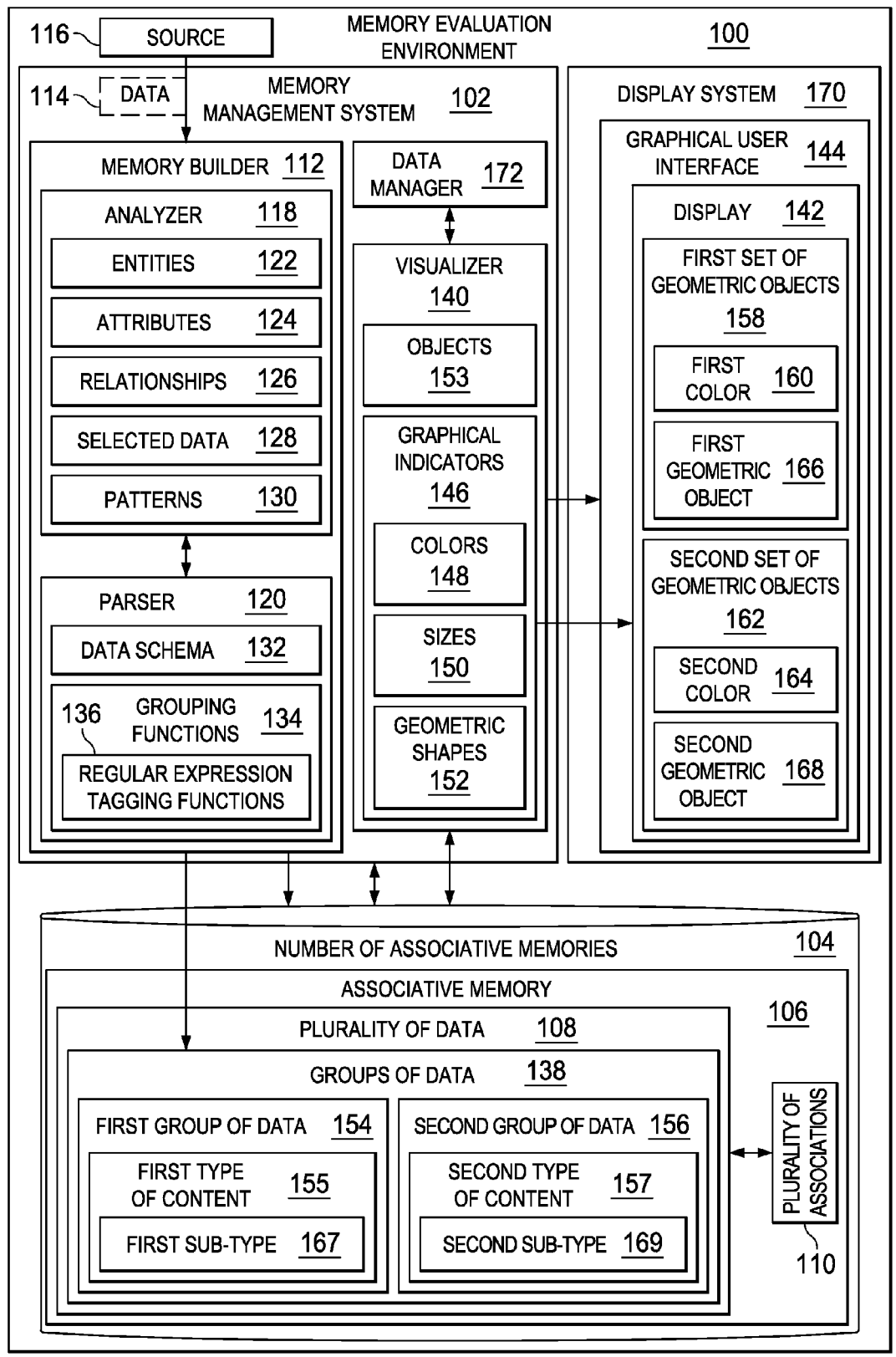
FIG. 1 is an illustration of an evaluation environment in accordance with an advantageous embodiment.

The concept of using human intelligence to improve the effectiveness and speed of software and hardware in computer systems is the foundation for the different types of associative memory technologies currently being used and developed. Typically, an associative memory system may be implemented using a neural network, artificial intelligence (AI), and/or other suitable technologies capable of forming associations between data and then retrieving data based on these associations. Data stored in an associative memory may be addressed by content instead of addressed by where content is stored, as in the different technology of databases. The data stored in the associative memory system may come from various sources of data. For example, an associative memory may be created using data from any number of databases, tables, spreadsheets, logs, images, files, data structures, and/or other sources of data.

In particular, associative memory may be configured to ingest the data stored in these various sources of data. As used herein, the term "ingest" contemplates an associative memory incorporating new data into existing data present in the associative memory and then forming associations within the newly ingested data and/or between the newly ingested data and previously ingested data. The term "ingest" also contemplates reincorporating previously ingested data in order to form new relationships among the previously ingested data.

Creating an associative memory typically includes analyzing the received data to identify information about the data. Analyzing data may include determining whether the data is important, determining whether the data follows a pattern common to other data, determining whether the data is referenced in different ways in the associative memory, identifying data, and/or identifying other information about the data. As used herein, the plural term "data" includes the singular "datum".

Further, creating an associative memory also may include pre-processing to categorize the data. Pre-processing may include identifying patterns that occur repeatedly throughout the data and categorizing the data based on these patterns and/or other information.

Evaluating and validating the content of a newly created associative memory using currently available methods may be more time-consuming and require more effort than desired. For example, some currently available methods for evaluating and validating the content of a newly created associative memory may require a human analyst visually inspecting data in the different categories stored in the associative memory. This type of visual inspection of the content of an associative memory may be tedious and take more time than desired.

The different advantageous embodiments recognize and take into account different considerations. For example, the different advantageous embodiments recognize and take into account that currently available methods for validating the content of associative memories may take more time and effort than desired.

In particular, currently available methods for validating the content of associative memories may include a human operator, such as an analyst, visually comparing a data schema for an associative memory to the data stored in the associative memory. As used herein, a "data schema" for an associative memory defines the organization and/or structure of the associative memory. In particular, a data schema determines how an associative memory is to ingest data.

For example, an associative memory may receive data that is unstructured. For example, the data may be free-form text. The associative memory may ingest this data by parsing different portions of the free text data into categories based on a data schema for the associative memory. The data schema may be organized into rows and columns of data.

With currently available methods for validating the content of the associative memory, an analyst may need to visually inspect some or all of the content and determine whether each item of data has been correctly categorized. The different advantageous embodiments recognize and take into account that this process of visual inspection may be tedious and time-consuming, and in some cases, may be physically demanding of the analyst.

Further, the different advantageous embodiments recognize and take into account that when the data in an associative memory contains thousands to millions of items, visual inspection of the data performed by an analyst may not be as accurate as desired.

Additionally, the different advantageous embodiments recognize and take into account that currently available methods for evaluating the content of an associative memory may not allow an analyst to readily identify changes between different versions of an associative memory.

For example, an associative memory may be created using data from a particular data source. The data at this source may change over time. As a result, the associative memory may be recreated or modified some number of times to incorporate the new and/or modified data into the associative memory. The different advantageous embodiments recognize and take into account that currently available methods for validating the content of an associative memory may not allow an analyst to identify trends across different versions of an associative memory as quickly as desired.

The different advantageous embodiments provide a method and apparatus for visually evaluating the contents of an associative memory. In particular, the different advantageous embodiments provide a system that allows an analyst to quickly identify inconsistencies in the categorization of data in the associative memory.

For example, in one advantageous embodiment, a method for validating content may be provided. A plurality of data may be ingested into an associative memory. The associative memory may form a plurality of associations among the plurality of data. The associative memory may be configured to be queried based on at least one relationship selected from a group consisting of direct relationships and indirect relationships among the plurality of data. The associative memory may comprise a content-addressable structure, the content-addressable structure comprising a memory organization in which the plurality of data may be configured to be accessed by content as opposed to being configured to be accessed by addresses for the plurality of data. The plurality of data may be parsed into at least a first group of data and a second group of data according to a plurality of types of content present in the plurality of data. The first group of data and the second group of data may be communicated in a graphical representation.

With reference now to the figures and, in particular, with reference to FIG. 1, an illustration of an evaluation environment is depicted in accordance with an advantageous embodiment. In these illustrative examples, memory evaluation environment 100 may include memory management system 102. Memory management system 102 may be implemented using hardware, software, or a combination of both in these examples.

For example, memory management system 102 may be implemented using one or more data processing systems. These data processing systems may be in a distributed or networked environment. In some cases, memory management system 102 may be implemented using a group of remotely administered data processing systems known as a "cloud". Further, memory management system 102 may be characterized as including one or more modules that may be separate or part of a monolithic architecture.

In these illustrative examples, memory management system 102 may be configured to manage number of associative memories 104. As used herein, a "number of" items may mean one or more items. For example, a number of associative memories may mean one or more associative memories. Depending on the implementation, associative memories in number of associative memories 104 may be different versions of an associative memory.

Each of number of associative memories 104 may include a plurality of data and a plurality of associations among the plurality of data. The plurality of data and the plurality of associations in an associative memory may be stored in a non-transitory computer readable storage medium. As used herein, a "plurality of" items may mean two or more items. For example, a plurality of associations may mean two or more associations. In some cases, the plurality of data may include, for example, compressed data, encrypted data, or a combination of the two.

The plurality of data may be collected into associated units of data, such as a first associated unit of data, a second associated unit of data, and a third associated unit of data. More or fewer associated units of data may be present. An associated unit of data may be two or more sets of data that are associated with each other in some manner.

An associative memory may be configured to be queried based on indirect relationships among the plurality of data in addition to direct correlations among the plurality of data. An associative memory may also be configured to be queried based on direct relationships and combinations of direct and indirect relationships. An example of a direct relationship may be the relationship of two sets of data that form an associated unit of data. A direct relationship may also be a direct relationship between two associated units of data.

An indirect relationship may exist when a direct relationship does not exist but when data are indirectly connected. For example, an indirect relationship may be between the first associated unit of data and the third associated unit of data when the first associated unit of data is directly related to the second associated unit of data and the second associated unit of data is directly related to the third associated unit of data. Many other examples of direct and indirect relationships are possible.

Further, an associative memory may include a content-addressable structure. A content-addressable structure may provide the associative memory with the capability to be queried based on the content in the associative memory or the plurality of data itself, rather than on addresses associated with the data in the associative memory. In some cases, the content-addressable structure may allow the associative memory to map input patterns in the plurality of data to output patterns in the plurality of data.

Associative memory 106 may be an example of one of number of associative memories 104. Associative memory 106 may include plurality of data 108 and plurality of associations 110 among plurality of data 108. In these illustrative examples, associative memory 106 may be created using memory builder 112 in memory management system 102.

As one illustrative example, memory builder 112 may create associative memory 106 using data 114. Further, data 114 may include a number of different types of data. For example, data 114 may include, but is not limited to, at least one of free-form text, words, sentences, numbers, serial numbers, geographic coordinates, symbols, a model, a computer aided design (CAD) model, images, sensor data, statistical analysis results, inventory lists, and other suitable types of data.

Data 114 may be received from source 116. Source 116 may include any number of different sources for data 114. For example, source 116 may include, but is not limited to, at least one of a database, a table, a file, a spreadsheet, a log, a report, a word document, a slide presentation, a server, a sensor system, a storage device, memory, and other suitable types of sources.

In these illustrative examples, memory builder 112 may include analyzer 118 and parser 120. Analyzer 118 may be configured to analyze data 114 received from source 116. Analyzer 118 may place data 114 received from source 116 into a data stream for processing by analyzer 118. In some cases, when data 114 includes compressed and/or encrypted data, analyzer 118 may perform at least one of decompressing and unencrypting data 114 into the data stream for processing.

In analyzing data 114, analyzer 118 may determine which items in data 114 are important. The items in data 114 that are important may be the data needed to create associative memory 106. Further, the items in data 114 that are important may take the form of, for example, entities 122 and/or attributes 124 for entities 122.

As used herein, an "entity" may be a thing which is recognized as being capable of an independent existence and which can be uniquely identified. In particular, an entity may be an abstraction of some aspect of the real world which can be distinguished from other aspects of the real word. An entity may be a physical object, such as a car or aircraft, an event, such as a sale or car wash, a concept, such as a client transaction or part number, or some combination thereof.

Further, as used herein, an "attribute" may be a characteristic, property, or some other type of factor for an entity. As one illustrative example, an entity may be a car, and an attribute for this entity may be a vehicle identification number (VIN). As another example, an entity may be a location, and an attribute for this entity may be the geographic coordinates for the location.

In some cases, items in data 114 that may be important may include data that takes the form of relationships 126. Attributes 124 may include attributes for relationships 126. As used herein, a "relationship" may be a link between two or more entities. A relationship may capture how two or more entities are associated with each other. As one illustrative example, a first entity may be a car and a second entity may be a person. The relationship between these two entities may be that the person owns the car.

In these illustrative examples, analyzer 118 may select at least a portion of entities 122, attributes 124, and/or relationships 126 in data 114 to form selected data 128. As used herein, "at least a portion of" items means one, some, or all of the items. For example, at least a portion of entities 122 may be one, some, or all of entities 122. Selected data 128 may be the portion of data 114 that is to be stored in associative memory 106 as plurality of data 108.

Analyzer 118 may further determine whether selected data 128 occurs in patterns 130. A pattern in patterns 130 may be, for example, without limitation, a specific format for a sequence of alphabetic, numeric, symbolic, and/or other suitable types of characters. As one illustrative example, an attribute in attributes 124 may be a social security number. Data 114 that are this type of attribute may occur in a particular pattern that includes a format for a particular number of numeric characters and symbolic characters. Analyzer 118 may also take into account formatting, such as bolding, italicization, case, underlining, color, and/or other suitable types of formatting.

In these illustrative examples, analyzer 118 may send selected data 128 to parser 120 in a data stream for processing by parser 120. Parser 120 may be configured to use patterns 130 identified by analyzer 118 to generate data schema 132 for the data to be stored in associative memory 106. Data schema 132 may be a structure or layout for associative memory 106. Further, parser 120 may use patterns 130 identified by analyzer 118 to generate grouping functions 134 that may group selected data 128 in a manner that organizes selected data 128 according to data schema 132.

Grouping functions 134 may take the form of, for example, regular expression tagging functions 136. Regular expression tagging functions 136 may include a plurality of expressions. In particular, regular expression tagging functions 136 may identify and mark patterns 130 that occur repeatedly throughout selected data 128 such that selected data 128 may be parsed into groups of data 138. In other words, parser 120 may parse selected data 128 into groups of data 138 using regular expression tagging functions 136. Groups of data 138 may form plurality of data 108 to be ingested into associative memory 106. In these illustrative examples, groups of data 138 may also be referred to as categories of data.

Plurality of associations 110 formed in associative memory 106 may be associations among the data in groups of data 138. For example, memory builder 112 and/or associative memory 106, itself, may be configured to identify associations between the data in groups of data 138 to form plurality of associations 110. Further, in some cases, plurality of associations 110 in associative memory 106 may include a portion of relationships 126 in selected data 128.

In these illustrative examples, memory management system 102 may also include visualizer 140. Visualizer 140 may be configured to graphically represent the content in number of associative memories 104. For example, visualizer 140 may be configured to graphically represent the content in associative memory 106 in the form of display 142 in graphical user interface 144.

In particular, visualizer 140 may be configured to communicate groups of data 138 in a graphical representation in display 142 that may allow a human operator, such as an analyst, to readily distinguish between the different groups in groups of data 138. For example, visualizer 140 may use graphical indicators 146 to distinguish between groups of data 138.

Graphical indicators 146 may include any number of colors 148, sizes 150, geometric shapes 152, and/or other suitable types of graphical indicators for representing the content in associative memory 106 as objects 153 in display 142. In some cases, graphical indicators 146 may include different types of cross-hatching, different types of shading, different types of borders for objects 153, and/or other suitable types of graphical indicators. Further, graphical indicators 146 may include labels, text, symbols, highlighting, and/or other suitable types of graphical indicators.

As one illustrative example, groups of data 138 may include first group of data 154 and second group of data 156. First group of data 154 may include first type of content 155, while second group of data 156 may include second type of content 157. In this illustrative example, first type of content 155 may be, for example, without limitation, nouns. Second type of content 157 may be, for example, without limitation, discrete numbers.

Visualizer 140 may be configured to graphically represent first group of data 154 in a manner that is different from the manner in which second group of data 156 is graphically represented. For example, visualizer 140 may be configured to visually represent first group of data 154 as first set of geometric objects 158 having first color 160 and second group of data 156 as second set of geometric objects 162 having second color 164. First set of geometric objects 158 and second set of geometric objects 162 are examples of objects 153.

First color 160 for first set of geometric objects 158 may represent first type of content 155. Second color 164 for second set of geometric objects 162 may represent second type of content 157.

Further, in this illustrative example, each of first set of geometric objects 158 may represent a different sub-type of first type of content 155. For example, first geometric object 166 in first set of geometric objects 158 may represent first sub-type 167 of first type of content 155. Further, each of second set of geometric objects 162 may represent a different sub-type of second type of content 157. For example, second geometric object 168 in second set of geometric objects 162 may represent second sub-type 169 of second type of content 157.

In other illustrative examples, first color 160 for each of first set of geometric objects 158 may have a different intensity representing a different sub-type of first type of content 155. For example, first color 160 for first geometric object 166 may have a first intensity that represents first sub-type 167. Further, second color 164 for each of second set of geometric objects 162 may have a different intensity representing a different sub-type of second type of content 157. For example, second color 164 for second geometric object 168 may have a second intensity that represents second sub-type 169.

Additionally, visualizer 140 may be configured to generate first geometric object 166 with a first size that is proportionate to a first number of occurrences of first sub-type 167. Further, visualizer 140 may be configured to generate second geometric object 168 with a second size that is proportionate to a second number of occurrences of second sub-type 169.

In some illustrative examples, first geometric object 166 may have a first shape that represents first information about first group of data 154. Further, second geometric object 168 may have a second shape that represents second information about second group of data 156.

Further, visualizer 140 may be configured to visually present display 142 in graphical user interface 144 on display system 170. In these illustrative examples, display system 170 may include a number of display devices. These display devices may include, for example, without limitation, a monitor, a liquid crystal display, a touch screen, a head-mounted display device, or some other suitable type of display device.

In some illustrative examples, one or more of the display devices in display system 170 may be separate from memory management system 102. In other illustrative examples, one or more of these display devices may be part of memory management system 102. In this manner, the content in number of associative memories 104 may be evaluated at a same location as where number of associative memories 104 is created or at a location remote to where number of associated memories 104 is created.

Visualizer 140 may be configured to graphically represent groups of data 138 in associative memory 106 in a number of different ways such that a human operator, such as an analyst, at display system 170 may evaluate and validate the content of associative memory 106. For example, the analyst may use display 142 to determine whether the data in the different groups in groups of data 138 have been parsed correctly within selected tolerances. In particular, the analyst may use graphical indicators 146 to determine whether selected data 128 was correctly parsed.

If the analyst determines that selected data 128 has not been correctly parsed, the analyst may modify grouping functions 134 used by parser 120 to parse selected data 128. Parser 120 may then re-parse selected data 128 using the modified grouping functions 134 to create a new version of associative memory 106 in number of associative memories 104. Further, visualizer 140 may then represent the content of the new version of associative memory 106 in display 142.

In these illustrative examples, visualizer 140 may be configured to visually present the content of both the old version and the new version of associative memory 106. In this manner, the analyst may have an opportunity to use graphical indicators 146 to readily identify changes in the content of the two versions of associative memory 106. Modifications may be made to grouping functions 134 as many times as needed until the analyst determines that selected data 128 has been correctly parsed based on display 142.

Further, an analyst may view the content of a plurality of associative memories in number of associative memories 104 to identify trends across different associative memories. Graphical indicators 146 representing different aspects of the groups of data stored in the different associative memories may allow the analyst to more readily identify trends across the different associative memories as compared to visually inspecting each item of data stored in the associative memories.

In some illustrative examples, memory management system 102 may include data manager 172. Data manager 172 may be separate from or part of memory builder 112 in these examples. Further, in some cases, data manager 172 may be implemented in parser 120 in memory builder 112. Data manager 172 may be in communication with visualizer 140. Data manager 172 may be configured to manipulate the graphical representation of groups of data 138 in display 142.

In some illustrative examples, data manager 172 may be configured to re-parse first group of data 154 and second group of data 156 stored in associative memory 106 for re-communication to visualizer 140. First group of data 154 may be re-communicated as first sub-divisions of first group of data 154, while second group of data 156 may be re-communicated as second sub-divisions of second group of data 156.

The illustration of a memory evaluation environment in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an advantageous embodiment.

With reference now to FIG. 2, an illustration of a display of the content in an associative memory is depicted in accordance with an advantageous embodiment. In this illustrative example, display 200 may be an example of one implementation for display 142 in FIG. 1. As depicted, content 202 is displayed in display 200. The display of content 202 is an example of one implementation for the display of the content in associative memory 106 in FIG. 1.

In this illustrative example, objects 204, 206, 208, 210, 212, and 214 are examples of implementations for objects 153 in FIG. 1. As depicted in this example, each of objects 204, 206, 208, 210, 212, and 214 is displayed with a different type of cross-hatching. In this manner, each of objects 204, 206, 208, 210, 212, and 214 represents a different type of content of data. In particular, each of objects 204, 206, 208, 210, 212, and 214 represents a different group of data. Further, the size of each of objects 204, 206, 208, 210, 212, and 214 may be proportionate to a number of occurrences of data within the corresponding group of data in the associative memory.

An operator may view display 200 and use the cross-hatching and sizes of the objects to determine whether content 202 of the associative memory has been correctly parsed. Further, the operator may select an object in display 200 to view further information about the group of data being represented by the object.

The advantageous embodiments described with respect to FIG. 2 may include different display schemes. For example, the cross-hatching shown in FIG. 2 may be replaced with colors, with each type of cross-hatching replaced by a different color.

Further, although the advantageous embodiments described herein mention information about aircraft, such as aircraft images, aircraft identification numbers, and the like, the advantageous embodiments are not limited to these examples, to images of any kind, or to any specific kind of data. The advantageous embodiments may be used to represent any data, types of data, or distributions of data in an associative memory. The specific embodiments shown in this specification and in the drawings are presented solely as examples, and these examples do not necessarily limit the claimed inventions.

Turning now to FIG. 3, an illustration of a display of the content in an associative memory is depicted in accordance with an advantageous embodiment. In this illustrative example, display 300 may be an example of one manner in which visualizer 140 in FIG. 1 may display information about one of objects 204, 206, 208, 210, 212, and 214 in FIG. 2 in response to a selection of the object. In this illustrative example, display 300 may be displayed in response to a selection of object 204 in FIG. 2.

As depicted, group information 302 in display 300 may identify the group of data and type of content corresponding to object 204 in display 200 in FIG. 2. Object 204 in FIG. 2 may represent a group of data in which the type of content in the group of data takes the form of nouns. In other words, all of the data in this group of data may take the form of nouns.

Further, sub-type information 304 in display 300 may identify the different sub-types for this type of content. For example, sub-type information 304 may indicate that the nouns in this group of data have sub-types 306, 308, 310, and 312. Sub-type 306 may include the data in the group of data that are nouns beginning with the letter "A". Sub-type 308 may include the data in the group of data that are nouns beginning with the letter "B". Sub-type 310 may include the data in the group of data that are nouns beginning with the letter "C". Further, sub-type 312 may include the data in the group of data that are nouns beginning with the letter "F".

Additionally, sub-type information 304 may indicate the number of occurrences of data in each corresponding sub-type. For example, about 722 occurrences of sub-type 306 of nouns may be present in the group of data represented by object 204 in FIG. 2. The operator may use the information presented in display 300 to determine whether the data in the group of data has been correctly categorized as nouns and correctly parsed into the different sub-types of nouns. The operator may select any one of sub-types 306, 308, 310, and 312 to view further information about the sub-type.

With reference now to FIG. 4, an illustration of a display of the content in an associative memory is depicted in accordance with an advantageous embodiment. In this illustrative example, display 300 may be an example of one manner in which visualizer 140 in FIG. 1 may display information about one of sub-types 306, 308, 310, and 312 in FIG. 3 in response to a selection of the sub-type. In this illustrative example, display 400 may be displayed in response to a selection of sub-type 312 in FIG. 3.

Display 400 may display sub-type content 402. Sub-type content 402 identifies the occurrences of data of sub-type 312 in FIG. 3 of nouns in the group of data represented by object 204 in FIG. 2. These occurrences may be referred to as sets of data, data elements, or data items. As depicted, sub-type content 402 includes occurrences 404, 406, 408, 410, 412, and 414.

In this illustrative example, the operator may determine that occurrence 408 and occurrence 410 have been correctly categorized and do belong to sub-type 312 of nouns. However, the operator may determine that occurrences 404, 406, 412, and 414 are not nouns. Instead, occurrences 404, 406, 412, and 414 may belong to the group of data represented by object 206 in FIG. 2. In other words, these data may be aircraft location identifiers.

Based on display 400, the operator then may make modifications to regular expression tagging functions 136 that were used to parse the data into the groups of data represented by objects 204, 206, 208, 210, 212, and 214 in FIG. 2. In particular, the operator may modify the regular expression tagging functions such that the data that are aircraft location identifiers are not categorized as nouns but, instead, added to the group of data represented by object 206 in FIG. 2.

Figure 5:
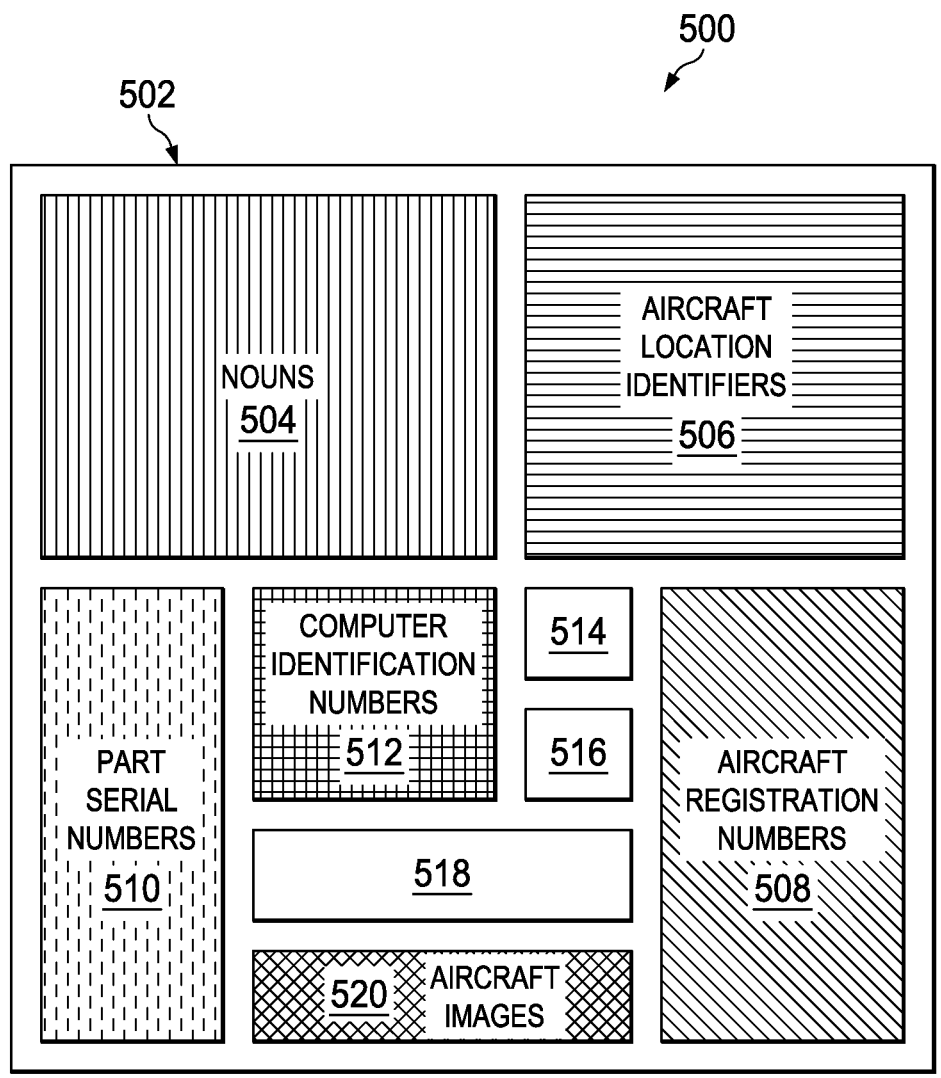
FIG. 5 is an illustration of a display of the content in an associative memory in accordance with an advantageous embodiment.

With reference now to FIG. 5, an illustration of a display of the content in an associative memory is depicted in accordance with an advantageous embodiment. In this illustrative example, display 500 is an example of one implementation for display 142 in FIG. 1. As depicted, content 502 may be displayed in display 500. The display of content 502 may be an example of one implementation for the display of the content in associative memory 106 in FIG. 1.

In particular, content 502 may be the content of a newer version of an associative memory created using the same data used in creating the associative memory with content 202 in FIG. 2. Further, this newer version of associative memory may have been created using grouping functions modified based on display 400 in FIG. 4.

Objects 504, 506, 508, 510, 512, 514, 516, 518, and 520 may be displayed in display 500. Objects 504, 506, 508, 510, 512, and 520 may correspond to objects 204, 206, 208, 210, 212, and 214, respectively, in FIG. 2. In other words, corresponding objects may represent the same type of content.

For example, object 504 and object 204 in FIG. 2 both may represent nouns. Further, object 506 and object 206 in FIG. 2 both may represent aircraft location identifiers.

In this illustrative example, objects 514, 516, and 518 form a set of objects, such as, for example, first set of geometric objects 158 in FIG. 1. Objects 514, 516, and 518 may represent a group of data having a type of content that has three different sub-types. This group of data may be a new group of data not represented in content 202 in display 200 in FIG. 2. This new group of data may have been formed based on the modifications made to the regular expression tagging functions.

As depicted, the size of object 504 representing the group of data that are nouns has decreased, and the size of object 506 representing the group of data that are aircraft location identifiers has increased. The operator may determine using these graphical indicators that the data has now been correctly parsed in this version of the associative memory.

Although the advantageous embodiments described herein mention information about aircraft, such as aircraft images, aircraft identification numbers, and the like, the advantageous embodiments are not limited to these examples, to images of any kind, or to any specific kind of data. The advantageous embodiments may be used to represent any data, types of data, or distributions of data in an associative memory. The specific embodiments shown in this specification and in the drawings are presented solely as examples, and these examples do not necessarily limit the claimed inventions.

Figure 6:
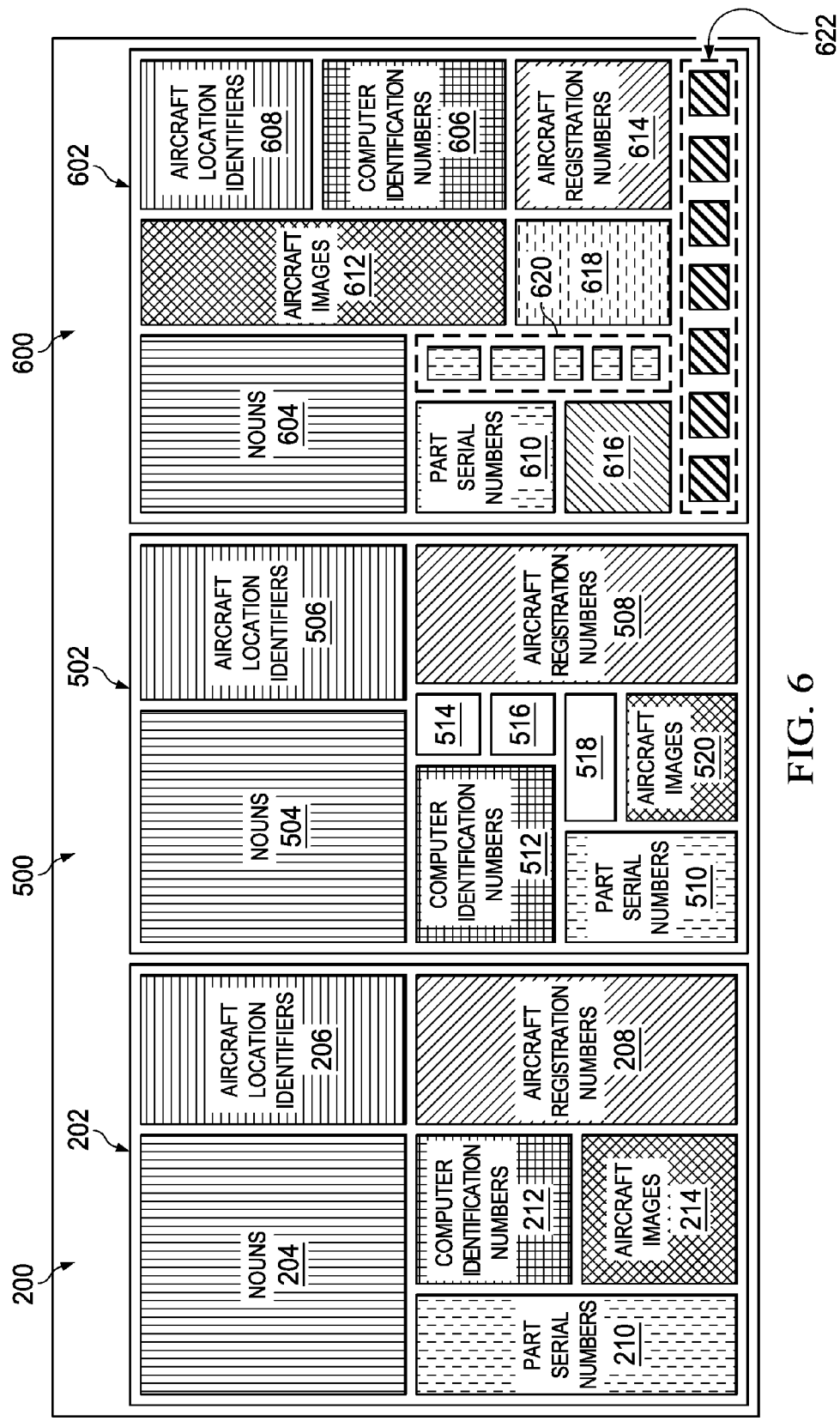
FIG. 6 is an illustration of a display of the content of multiple associative memories in accordance with an advantageous embodiment.

With reference now to FIG. 6, an illustration of a display of the content of multiple associative memories is depicted in accordance with an advantageous embodiment. In this illustrative example, display 600 may be an example of one implementation for display 142 in FIG. 1. As depicted, display 600 may include content 202 from FIG. 2, content 502 from FIG. 5, and content 602.

In this illustrative example, content 602 may be for a newer version of the associative memory that may be newer than the version of the associative memory with content 502 in FIG. 5. As depicted, objects 604, 606, 608, 610, 612, 614, 616, and 618 may be displayed. Further, set of objects 620 and set of objects 622 may be displayed.

Object 604 may correspond to object 504 in FIG. 5 and object 204 in FIG. 2. Object 606 may correspond to object 512 in FIG. 5 and object 212 in FIG. 2. Object 608 may correspond to object 506 in FIG. 5 and object 206 in FIG. 2. Object 610 may correspond to object 510 in FIG. 5 and object 210 in FIG. 2. Object 612 may correspond to object 520 in FIG. 5 and object 214 in FIG. 2. Object 614 may correspond to object 508 in FIG. 5 and object 208 in FIG. 2.

In this illustrative example, corresponding objects may represent the same types of content. Object 616, object 618, set of objects 620, and set of objects 622 may represent new groups of data that have been formed based on modifications to the regular tagging functions used to create the associative memory since the version of the associative memory with content 502 in FIG. 5.

An operator may use display 600 to identify trends across these three different versions of the associative memory with content 202 in FIG. 2, content 502 in FIG. 5, and content 602 in FIG. 6. As one illustrative example, the operator may use the sizes of object 204, object 504, and object 604 to determine that fewer data are being categorized as nouns with each newer version of the associative memory.

Although the advantageous embodiments described herein mention information about aircraft, such as aircraft images, aircraft identification numbers, and the like, the advantageous embodiments are not limited to these examples, to images of any kind, or to any specific kind of data. The advantageous embodiments may be used to represent any data, types of data, or distributions of data in an associative memory. The specific embodiments shown in this specification and in the drawings are presented solely as examples, and these examples do not necessarily limit the claimed inventions.

Figure 7:
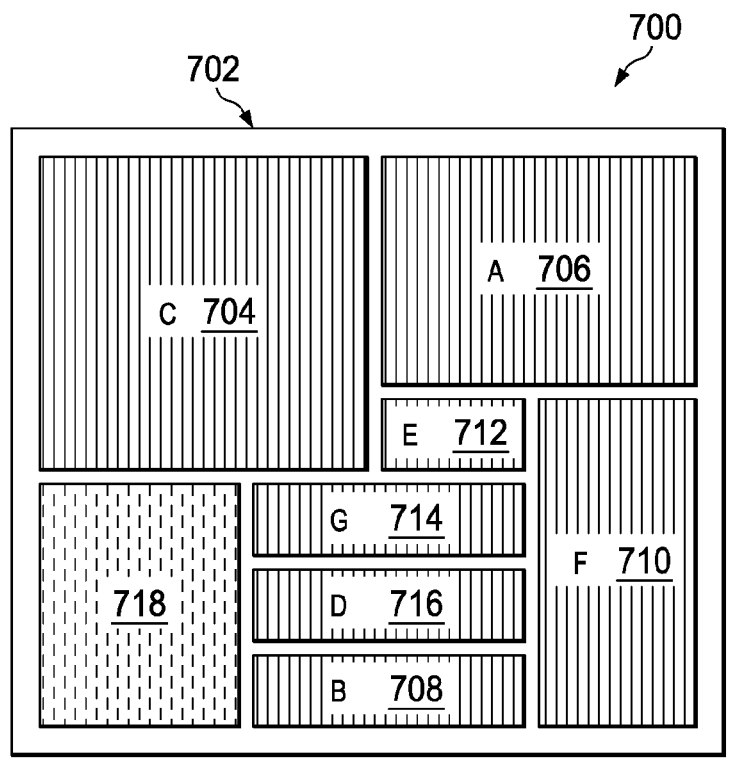
FIG. 7 is an illustration of a display of the content of another associative memory in accordance with an advantageous embodiment.

With reference now to FIG. 7, an illustration of a display of the content of another associative memory is depicted in accordance with an advantageous embodiment. In this illustrative example, display 700 may be an example of one implementation for display 142 in FIG. 1. In this illustrative example, content 702 of an associative memory may be displayed in display 700.

As depicted, objects 704, 706, 708, 710, 712, 714, 716, and 718 may be displayed in display 700. Objects 704, 706, 708, 710, 712, 714, and 716 may represent a first group of data of a first type of content, such as first group of data 154 in FIG. 1. This first type of content may be, for example, nouns. Object 718 may represent a second group of data of a second type of content, such as second group of data 156 in FIG. 1. This second type of content may be serial numbers.

As depicted, each of objects 704, 706, 708, 710, 712, 714, and 716 may be displayed with the same cross-hatching. The operator may view these objects and conclude that these objects represent the same type of content based on the same cross-hatching pattern used for these objects. Further, the operator may conclude that object 718 represents a different type of content than the type of content represented by objects 704, 706, 708, 710, 712, 714, and 716.

In this illustrative example, each of objects 704, 706, 708, 710, 712, 714, and 716 may represent a different sub-type of nouns. In particular, each of these objects may represent the portion of nouns in the group of data that begin with the corresponding letter displayed on the object.

Further, the sizes of objects 704, 706, 708, 710, 712, 714, and 716 may represent the number of occurrences of data of each sub-type of nouns. In this illustrative example, the operator may select any one of objects 704, 706, 708, 710, 712, 714, 716, and 718 displayed in display 700 to view additional information about the object.

Figure 8:
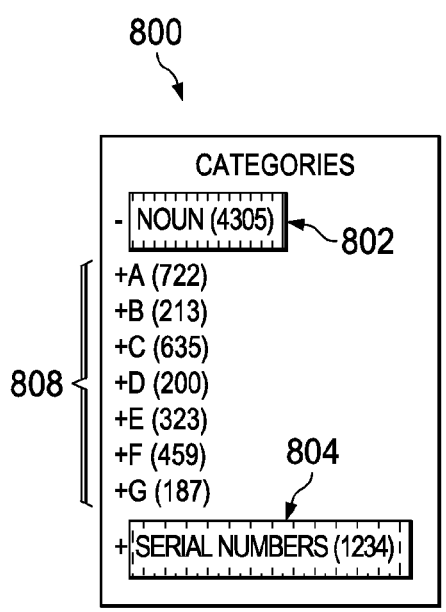
FIG. 8 is an illustration of another display of the content in an associative memory in accordance with an advantageous embodiment.

With reference now to FIG. 8, an illustration of another display of the content in an associative memory is depicted in accordance with an advantageous embodiment. In this illustrative example, display 800 may be an example of one manner in which visualizer 140 in FIG. 1 may display additional information about content 702 displayed in FIG. 7.

As depicted, label 802 and label 804 may be displayed. Label 802 may have the same cross-hatching as objects 704, 706, 708, 710, 712, 714, and 716 in FIG. 7, indicating that the group identified by label 802 is represented by objects 704, 706, 708, 710, 712, 714, and 716. Further, label 804 may have the same cross-hatching as object 718 in FIG. 7, indicating that the group identified by label 804 is represented by object 718.

In this illustrative example, sub-type information 808 may be displayed under label 802. Sub-type information 808 may identify the different sub-types of nouns represented by objects 704, 706, 708, 710, 712, 714, and 716, as well as the number of occurrences of data of the different sub-types.

Figure 9:
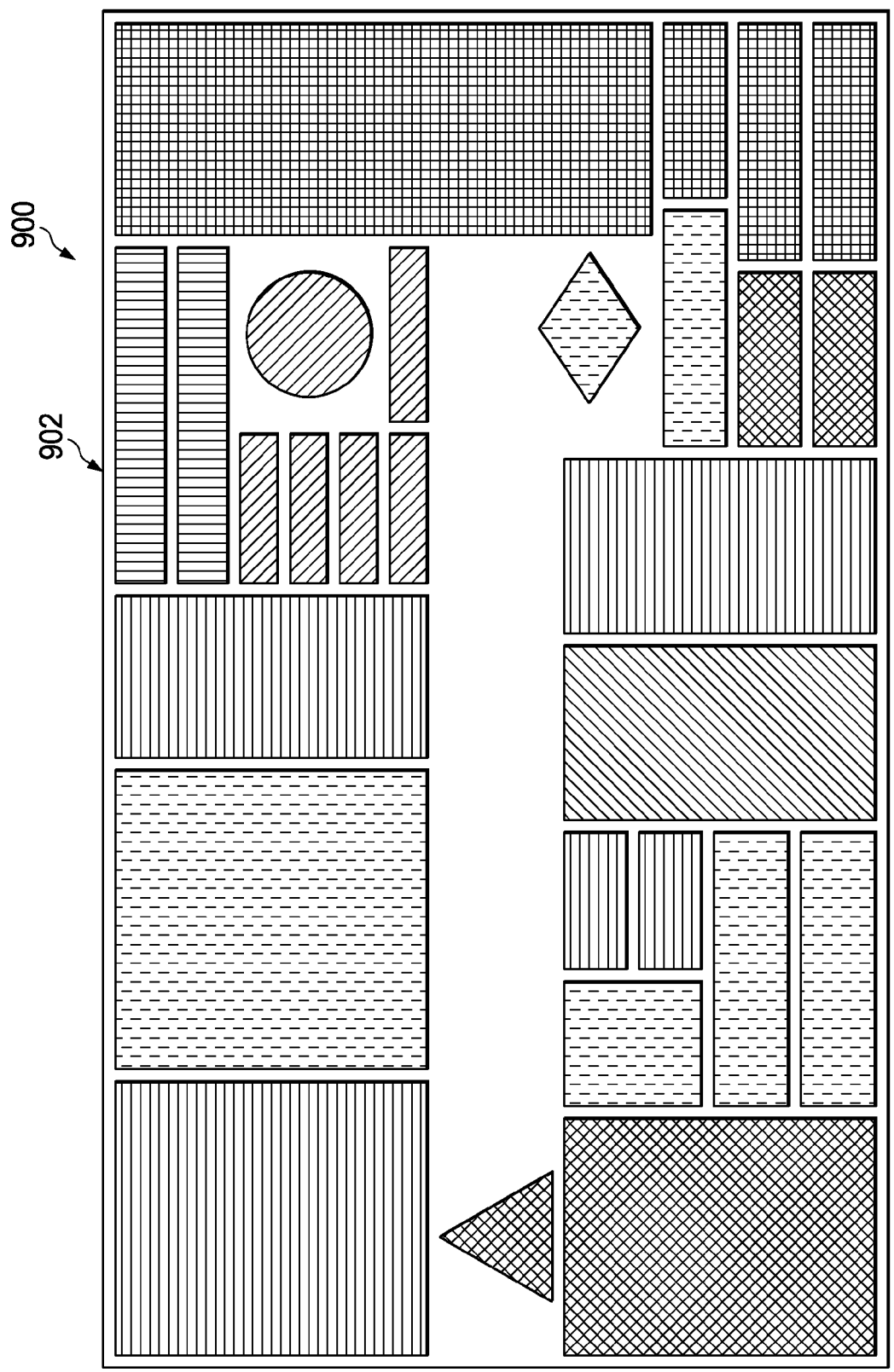
FIG. 9 is an illustration of a display of the content in an associative memory in accordance with an advantageous embodiment.

With reference now to FIG. 9, an illustration of a display of the content in an associative memory is depicted in accordance with an advantageous embodiment. In this illustrative example, display 900 may be an example of one implementation for display 142 in FIG. 1. As depicted, objects 902 may be displayed in display 900 using various types of graphical indicators. These graphical indicators may include size, shape, and color. These different graphical indicators may provide different types of information about the groups represented by each of the objects.

The illustrations of displays 200, 300, 400, 500, 600, 700, 800, and 900 in FIGS. 2, 3, 4, 5, 6, 7, 8, and 9, respectively, are not meant to imply physical or architectural limitations to the manner in which an advantageous embodiment may be implemented. For example, in some illustrative examples, display 300 in FIG. 3 and display 400 in FIG. 4 may be visually presented together in a same display in a graphical user interface. As another example, display 300 in FIG. 3 and display 400 in FIG. 4 may be displayed as windows within display 200 in FIG. 2.

Figure 10:
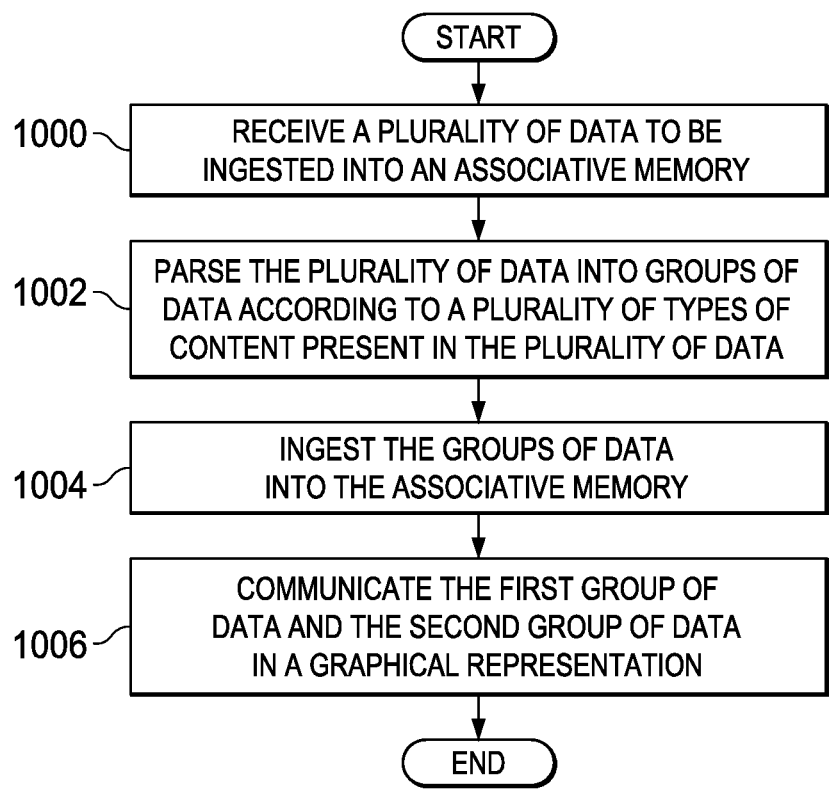
FIG. 10 is an illustration of a process for validating the content of an associative memory in accordance with an advantageous embodiment.

Turning now to FIG. 10, an illustration of a process for validating the content of an associative memory is depicted in accordance with an advantageous embodiment. The process illustrated in FIG. 10 may be implemented using memory management system 102 in FIG. 1. As used herein, the term "memory management system" need not be limited to memory management system 102 in FIG. 2, but may also include any processor or set of processors used together with a non-transitory computer readable medium in order to effectuate the operations described herein.

Figure 12:
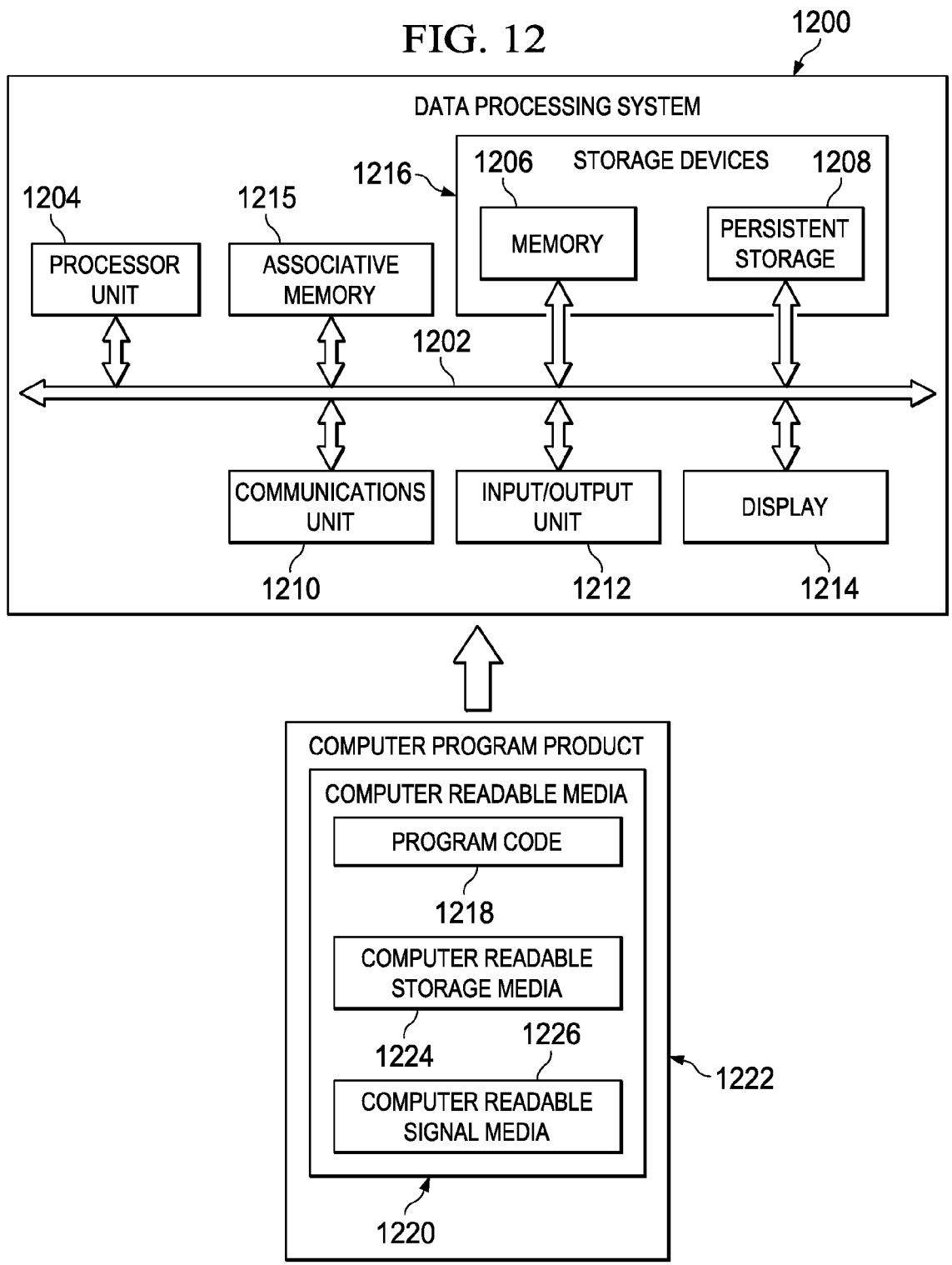
FIG. 12 is an illustration of a data processing system in accordance with an advantageous embodiment.

Further, the process illustrated in FIG. 10 may be implemented using one or more processors, possibly in a networked or distributed environment, such as, but not limited to, processor unit 1204 of FIG. 12. In this manner, the process illustrated in FIG. 10 may be implemented using software, hardware, or a combination thereof, but, in particular, may be used in conjunction with an associative memory.

Further, although one or more of the operations in FIG. 10 may be described as being performed by a memory management system, one or more of the operations described below may be performed by an associative memory, such as one of number of associative memories 104 in FIG. 1. Further, one or more of the operations may be performed by memory builder 112 in FIG. 1, analyzer 118 in memory builder 112 in FIG. 1, parser 120 in memory builder 112 in FIG. 1, visualizer 140 in FIG. 1, data manager 172 in FIG. 1, data processing system 1200 in FIG. 12, or by any suitable software component, hardware component, or combinations thereof.

The process may begin by a memory management system receiving a plurality of data to be ingested into an associative memory (operation 1000). The memory management system may then parse the plurality of data into groups of data according to a plurality of types of content present in the plurality of data (operation 1002). In particular, operation 1002 may be performed using patterns identified as occurring repeatedly in the plurality of data.

Thereafter, the groups of data may be ingested into the associative memory (operation 1004). The associative memory may also include a plurality of associations formed among the plurality of data ingested into the associative memory. Further, in this illustrative example, the associative memory may be configured to be queried based on at least one relationship selected from a group consisting of direct relationships and indirect relationships among the plurality of data. Further, the associative memory may comprise a content-addressable structure that has a memory organization in which the plurality of data is configured to be accessed by content as opposed to being configured to be accessed by addresses for the plurality of data.

Thereafter, the memory management system may communicate the first group of data and the second group of data in a graphical representation (operation 1006), with the process terminating thereafter. In operation 1006, the first group of data and the second group of data may be visually presented in a display in a graphical user interface, such as in display 142 in graphical user interface 144 in FIG. 1.

Figure 11:
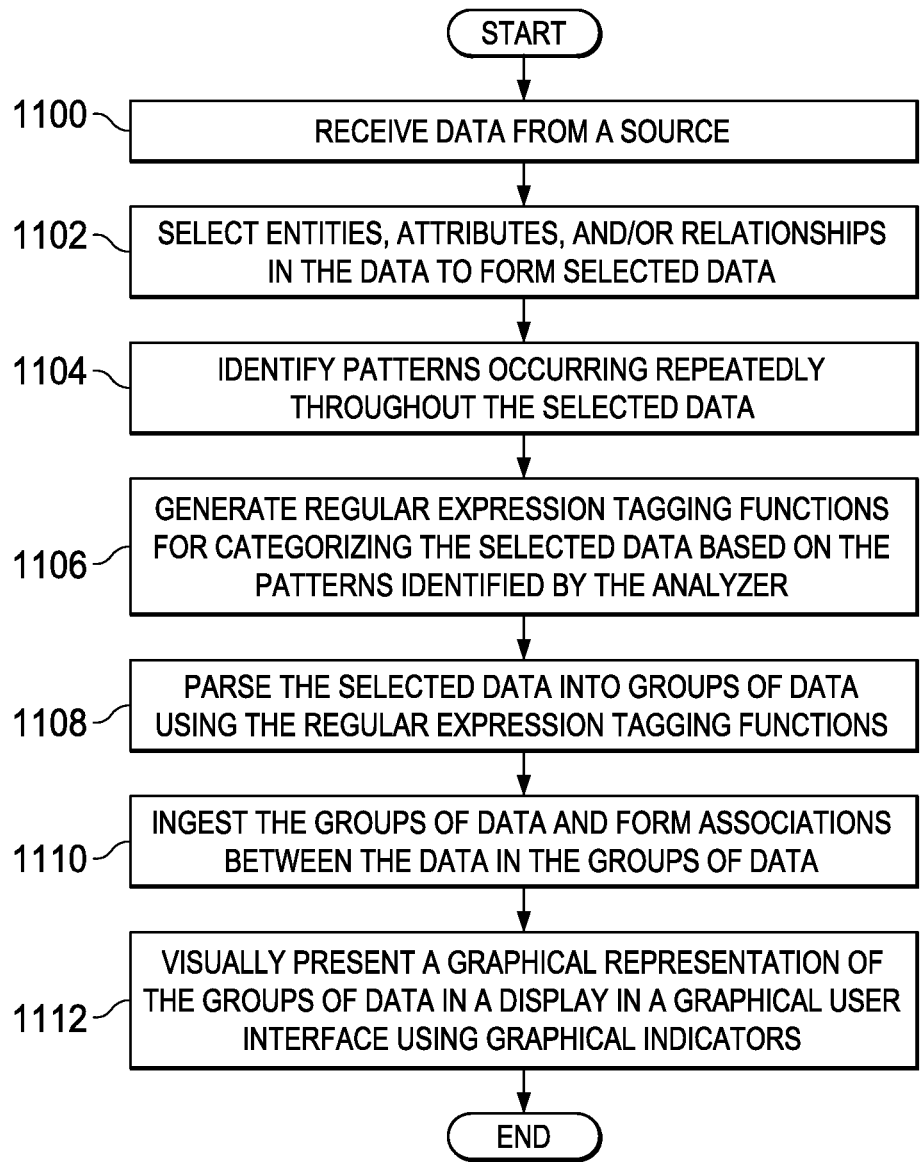
FIG. 11 is an illustration of a process for validating content in an associative memory in accordance with an advantageous embodiment.

With reference now to FIG. 11, an illustration of a process for validating content in an associative memory is depicted in accordance with an advantageous embodiment. The process illustrated in FIG. 11 may be implemented using the different components in memory management system 102 in FIG. 1. In particular, the process may be implemented using analyzer 118 in memory builder 112 in FIG. 1, parser 120 in memory builder 112 in FIG. 1, visualizer 140 in FIG. 1, and associative memory 106 in FIG. 1.

Further, the different operations described in FIG. 11 may be performed using any processor or set of processors used together with a non-transitory computer readable medium in order to effectuate the operations described herein. The process illustrated in FIG. 11 may be implemented using one or more processors, possibly in a networked or distributed environment, such as, but not limited to, processor unit 1204 of FIG. 12. In this manner, the process illustrated in FIG. 11 may be implemented using software, hardware, or a combination thereof, but, in particular, may be used in conjunction with an associative memory.

The process may begin by an analyzer in a memory builder receiving data from a source (operation 1100). Next, the analyzer may select entities, attributes, and/or relationships in the data to form selected data (operation 1102). Thereafter, the analyzer may identify patterns occurring repeatedly throughout the selected data (operation 1104).

A parser in the memory builder may generate regular expression tagging functions for categorizing the selected data based on the patterns identified by the analyzer (operation 1106). The parser may then parse the selected data into groups of data using the regular expression tagging functions (operation 1108).

The associative memory may then ingest the groups of data and form associations between the data in the groups of data (operation 1110). In operation 1110, the associations may be formed based on associations identified by the analyzer and/or parser in the memory builder. In some cases, the associations may be formed based on relationships recognized by the associative memory. For example, the associative memory may be configured to learn and identify relationships among the data.

Thereafter, a visualizer may visually present a graphical representation of the groups of data in a display in a graphical user interface using graphical indicators (operation 1112), with the process terminating thereafter. The graphical indicators may allow an operator viewing the graphical representation to readily identify information about the groups of data. In this manner, the operator may be able to evaluate the content of the associative memory and validate the content.

The flowcharts and block diagrams in the different depicted embodiments illustrate the architecture, functionality, and operation of some possible implementations of apparatuses and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 12, an illustration of a data processing system is depicted in accordance with an advantageous embodiment. In this illustrative example, data processing system 1200 may be used to implement one or more computers in memory management system 102 in FIG. 1. Data processing system 1200 includes communications fabric 1202, which provides communications between processor unit 1204, memory 1206, persistent storage 1208, communications unit 1210, input/output (I/O) unit 1212, display 1214, and associative memory 1215. In these illustrative examples, one or more of number of associative memories 104 in FIG. 1 may be implemented using associative memory 1215.

Processor unit 1204 serves to execute instructions for software that may be loaded into memory 1206. Processor unit 1204 may be a number of processors, a multi-processor core, or some other type of processor, depending on the particular implementation. "A number", as used herein with reference to an item, may mean one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208.

Computer readable storage media 1224 also may take the form of a persistent storage, such as a hard drive, a thumb drive, or a flash memory, that is connected to data processing system 1200. In some instances, computer readable storage media 1224 may not be removable from data processing system 1200. In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different advantageous embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1206, or a cache, such as found in an interface and memory controller hub that may be present in communications fabric 1202.

Thus, the different advantageous embodiments provide a method and apparatus for visually evaluating the contents of an associative memory. In particular, the different advantageous embodiments provide a system that allows an analyst to quickly identify inconsistencies in the categorization of data in the associative memory.

For example, in one advantageous embodiment, a method for validating content is provided. A plurality of data is ingested into an associative memory. The associative memory forms a plurality of associations among the plurality of data. The associative memory is configured to be queried based on at least one relationship selected from a group consisting of direct relationships and indirect relationships among the plurality of data. The associative memory comprises a content-addressable structure, the content-addressable structure comprising a memory organization in which the plurality of data is configured to be accessed by content as opposed to being configured to be accessed by addresses for the plurality of data. The plurality of data is parsed into at least a first group of data and a second group of data according to a plurality of types of content present in the plurality of data. The first group of data and the second group of data are communicated in a graphical representation.

The description of the different advantageous embodiments has been presented for purposes of illustration and description, and is not intended to be exhaustive or limited to the embodiments in the form disclosed. Many modifications and variations will be apparent to those of ordinary skill in the art.

Although the advantageous embodiments described herein mention information about aircraft, such as aircraft images, aircraft identification numbers, and the like, the advantageous embodiments are not limited to these examples, to images of any kind, or to any specific kind of data. The advantageous embodiments may be used to represent any data, types of data, or distributions of data in an associative memory. The specific embodiments shown in this specification and in the drawings are presented solely as examples, and these examples do not necessarily limit the claimed inventions.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for validating content, the apparatus comprising:
    an associative memory comprising a plurality of data received from a parser and a plurality of associations among the plurality of data;
        wherein the associative memory is configured to be queried based on at least one relationship selected from a group consisting of direct relationships and indirect relationships among the plurality of data;
        wherein the associative memory comprises a content-addressable structure, the content-addressable structure comprising a memory organization in which the plurality of data is configured to be accessed by the content as opposed to being configured to be accessed by addresses for the plurality of data;
    the parser in communication with the associative memory;
        wherein the parser is configured to parse the plurality of data into at least a first group of data and a second group of data;
        wherein the parser parses the plurality of data according to a plurality of types of content present in the plurality of data;
        wherein the first group of data comprises a first type of content and wherein the second group of data comprises a second type of content;
    a visualizer configured to communicate the first group of data and the second group of data in a graphical representation, wherein the visualizer is configured to visually present on a display the first group of data as a first set of geometric objects having a first color representing the first type of content and display the second group of data as a second set of geometric objects having a second color representing the second type of content; and
    a data manager in communication with the visualizer, wherein the data manager is configured to manipulate the graphical representation and re-parse the first group of data and the second group of data for re-communication to the visualizer as first sub-divisions of the first group of data and second sub-divisions of the second group of data.

2. The apparatus of claim 1, wherein the associative memory further comprises at least one of compressed data, encrypted data, and both compressed and encrypted data.

3. The apparatus of claim 2, wherein the parser is further configured to perform at least one of decompressing and unencrypting the plurality of data into a data stream.

4. The apparatus of claim 3, wherein the parser is further configured to further parse the data stream into the at least the first group of data and the second group of data.

5. The apparatus of claim 1, wherein the plurality of data comprises free text data, wherein the first type of content comprises nouns present in the free text data, and wherein the second type of content comprises discrete numbers present in the free text data.

6. The apparatus of claim 1, wherein a first geometric object of the first set of geometric objects represents a first sub-type of the first type of content and a second geometric object of the second set of geometric objects represents a second sub-type of the second type of content.

7. The apparatus of claim 6, wherein the visualizer is further configured to visually present on the display the first geometric object having a first size proportionate to a first number of occurrences of the first sub-type of the first type of content in the plurality of data and display the second geometric object having a second size proportionate to a second number of occurrences of the second sub-type of the second type of content in the plurality of data.

8. The apparatus of claim 1, wherein:
    the first color of a first geometric object of the first set of geometric objects has a first intensity, the first intensity representing a first sub-type of the first type of content; and
    the second color of a second geometric object of the second set of geometric objects has a second intensity, the second intensity representing a second sub-type of the second type of content.

9. The apparatus of claim 1, wherein:
    a first geometric object of the first set of geometric objects has a first shape, the first shape representing first information about the first group of data; and
    a second geometric object of the second set of geometric objects has a second shape, the second shape representing second information about the second group of data.

10. The apparatus of claim 1, wherein re-parsing is based on modification to regular expression tagging function, and wherein the first sub-division and the second sub-division provide a more detailed categorization of types of content than prior to reparsing.

11. A method for validating content, the method comprising:
    parsing a plurality of data into at least a first group of data and a second group of data according to a plurality of types of content present in the plurality of data;
    ingesting the plurality of data into an associative memory, wherein the associative memory forms a plurality of associations among the plurality of data;
        wherein the associative memory is configured to be queried based on at least one relationship selected from a group consisting of direct relationships and indirect relationships among the plurality of data; and wherein the associative memory comprises a content-addressable structure, the content-addressable structure comprising a memory organization in which the plurality of data is configured to be accessed by the content as opposed to being configured to be accessed by addresses for the plurality of data; and communicating the first group of data and the second group of data in a graphical representation.

12. The method of claim 11, wherein parsing the plurality of data into the at least the first group of data and the second group of data according to the plurality of types of content present in the plurality of data comprises:

generating a plurality of expressions for parsing the plurality of data into the at least the first group of data and the second group of data, wherein the plurality of expressions is configured to select data in the plurality of data for placement into the at least the first group of data and the second group of data based on a plurality of patterns corresponding to the plurality of types of content; and parsing the plurality of data into the at least the first group of data and the second group of data according to the plurality of types of content present in the plurality of data using the plurality of expressions.

13. The method of claim 12 further comprising:

determining whether first data in the first group of data belongs to the first group of data using the graphical representation of the first group of data and the second group of data;

determining whether second data in the second group of data belongs to the second group of data using the graphical representation of the first group of data and the second group of data; and adjusting the plurality of expressions for parsing the plurality of data when a portion of at least one of the first data in the first group of data does not belong to the first group of data and the second data in the second group of data does not belong to the second group of data.

14. The method of claim 11 further comprising:

performing at least one of decompressing and unencrypting the plurality of data into a data stream; and wherein parsing further comprises parsing the data stream into the at least the first group of data and the second group of data, wherein the first group of data comprises a first type of content and wherein the second group of data comprises a second type of content.

15. The method of claim 14, wherein communicating the first group of data and the second group of data in the graphical representation comprises:

visually presenting on a display the first group of data as a first set of geometric objects having a first color representing the first type of content; and visually presenting on the display the second group of data as a second set of geometric objects having a second color representing the second type of content.

16. The method of claim 15, wherein a first geometric object of the first set of geometric objects represents a first sub-type of the first type of content and a second geometric object of the second set of geometric objects represents a second sub-type of the second type of content, and wherein the method further comprises:

visually presenting on the display the first geometric object having a first size proportionate to a first number of occurrences of the first sub-type; and visually presenting on the display the second geometric object having a second size proportionate to a second number of occurrences of the second sub-type.

17. The method of claim 11 further comprising:

manipulating, by a data manager in communication with a visualizer, the graphical representation; and re-parsing, by the data manager, the first group of data and the second group of data for re-communication to the visualizer as first sub-divisions of the first group of data and second sub-divisions of the second group of data.

* * * * *